M., J. & A. LANDBY.
AUTOSLEIGH.
APPLICATION FILED JUNE 27, 1918.
1,296,531.
Patented Mar. 4, 1919.
2 SHEETS—SHEET 1.
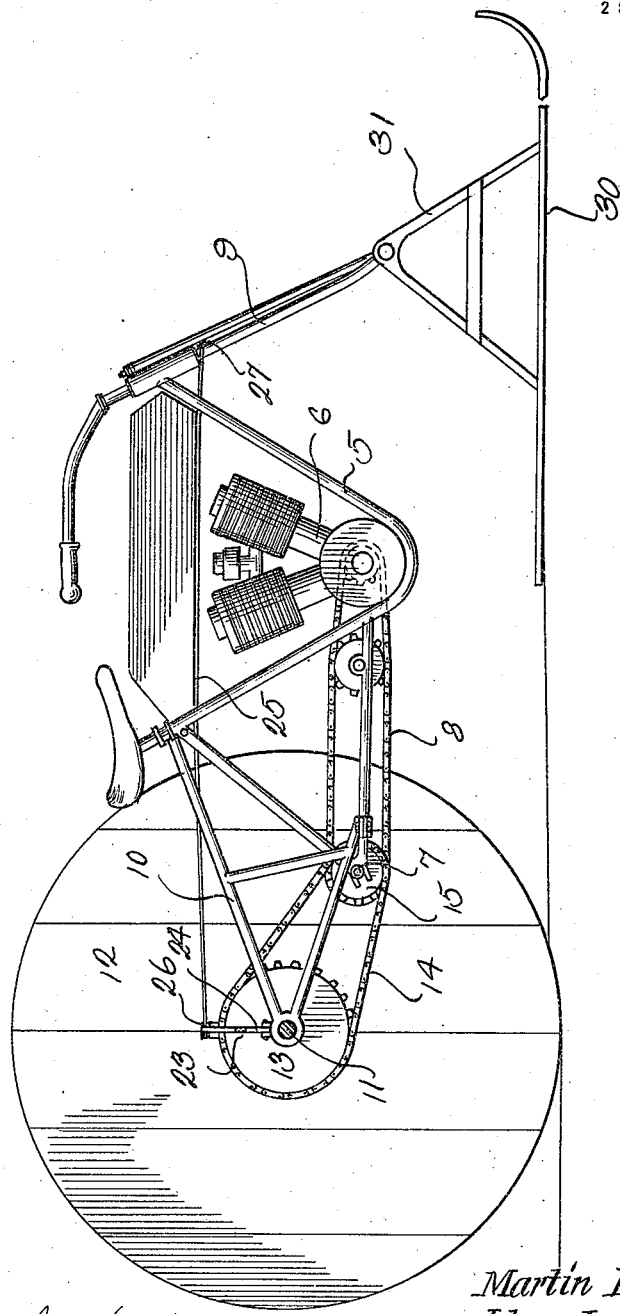
WITNESSES
R. W. Hoagland
D. C. Gow
INVENTORS
Martin Landby,
John Landby &
Andrew Landby.
BY Richard Beaver
ATTORNEY

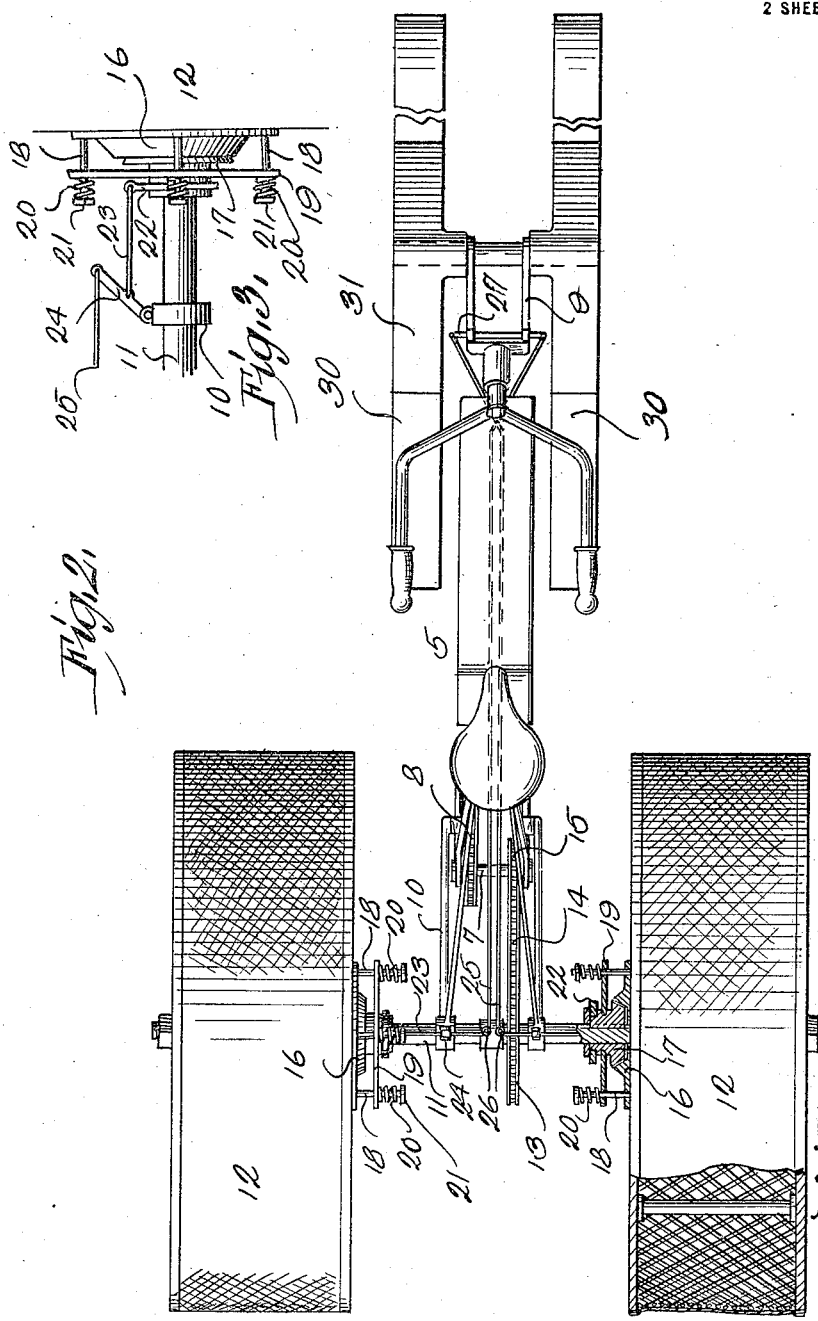

UNITED STATES PATENT OFFICE.

MARTIN LANDBY, JOHN LANDBY, AND ANDREW LANDBY, OF SWIFT, MINNESOTA.

AUTOSLEIGH.

1,296,531.  Specification of Letters Patent.  Patented Mar. 4, 1919.

Application filed June 27, 1918. Serial No. 242,260.

*To all whom it may concern:*

Be it known that we, MARTIN LANDBY, JOHN LANDBY, and ANDREW LANDBY, citizens of the United States, residing at Swift, in the county of Roseau and State of Minnesota, have invented certain new and useful Improvements in Autosleighs, of which the following is a specification.

This invention relates generally to auto sleighs, having for its primary object to generally simplify and improve the construction and operation of such devices, as well as to increase their efficiency.

A further object of the invention is to provide an attachment of such character that a bicycle or motorcycle may be readily adapted for use on snow or ice, and wherein improved means is used for imparting driving power from the bicycle or motorcycle to the propelling means carried by the attachment.

A further object of the invention is to provide a device of the character stated which is equipped with improved means for making or severing driving connections between the power source upon the vehicle and the tractor mechanism upon the attachment, whereby the vehicle is enabled to turn sharply in either direction without danger of breakage to the apparatus or overturning of the vehicle.

Still further objects reside in providing an attachment of the class mentioned which is of simple and improved construction, which may be readily applied to the vehicle, which is composed of but few, simple and readily assembled parts, which has its various parts so constructed and assembled as to minimize the opportunity for wear or breakage, and which will prove highly practical and efficient in use.

With these objects in view, together with others which will appear as the description proceeds, the invention resides in the novel formation, combination, and arrangement of parts, all as will be described more fully hereinafter, illustrated in the drawings, and particularly pointed out in the claim.

In the drawings:—

Figure 1 is a side elevation of an auto sleigh constructed in accordance with the invention, the traction wheel on the inner side being removed, Fig. 2 is a top plan view of the vehicle, the parts being shown in section, and Fig. 3 is a detail rear elevation illustrating particularly the clutch mechanism.

The device of our invention is adapted particularly for use in connection with motorcycles, and wherein the motor upon such vehicle is, by an improved means, utilized for imparting driving power to the tractor means included in the improved attachment. In converting the motorcycle into an auto sleigh, the rear or power wheel of the vehicle is removed, as is the rear mud-guard and other apparatus at the rear end of the machine. A sprocket wheel is applied to the rear axle in the place ordinarily occupied by the brake drum, and this sprocket is used to transmit power from the rear axle of the vehicle to the tractor means. The tractor means includes an axle carried by a frame which may be readily applied to the rear end of the vehicle, and the axle is equipped with traction wheels to support the rear end of the vehicle. The traction wheels are loosely mounted upon the axle, and an improved clutch device is associated with each of the wheels for selectively locking the wheel to the axle. This axle derives its rotary movement from the sprocket which is applied to the rear axle of the vehicle in place of the brake drum. The clutch mechanisms are actuated by the steering apparatus of the vehicle, so that power connections between the axle and wheels are made or severed automatically upon actuation of the steering apparatus. A toboggan or skee runners are secured to the front fork of the vehicle in place of the front wheel, so that the vehicle will be enabled to slide over the snow and ice.

More particularly, the motorcycle frame is indicated generally at 5, the motor or engine thereof at 6, the rear axle at 7, the chain for transmitting motion from the motor to the rear axle at 8, and the steering forks for the motorcycle at 9.

A frame or bracket 10 is secured to the vehicle frame at the rear thereof in any suitable manner, and is suitably braced and reinforced so as to enable the same to withstand the strains and pressures to which it will be subjected. The rear end of this frame or bracket projects beyond the rear lines of the motorcycle, and supports an axle 11. This axle is relatively long, and traction wheels 12 are loosely mounted upon the same at the ends thereof. These traction wheels are relatively wide, and preferably have their peripheries covered with cloth or other material to enable the same to obtain a firm grip upon snow and ice without permitting snow to adhere thereto. The axle 11 has a sprocket 13 rigidly secured thereto, over which passes a sprocket chain 14, the latter also passing over the sprocket wheel 15 secured to the axle 7 of the motorcycle. It is obvious, therefore, that rotary movement developed in the axle 7 will be transmitted to the supplemental axle carried by the frame 10.

The inner face of each of the wheels 12 is provided with a cone clutch socket or face 16 concentric with the axle 11. These cone faces are designed to receive the clutch heads 17 splined to the axle 11, so that a power connection may be established between the axle and the wheels 12.

Each of the wheels 12 is provided with stems 18 projecting from the inner face thereof and parallel with the axle 11. These stems slidably support plates 19, the latter being engaged at their medial portions with the clutch heads 17. Springs 20 encircle the stems 18 adjacent the outer ends thereof and tend to move the plates inwardly toward the adjacent wheel. Nuts 21 are threaded upon the free ends of the stems 18 and confine the springs 20 upon the said stems. It is obvious, therefore, that adjustment of the nuts upon the stems will regulate the tension of the springs 20. The springs are so arranged and are of such strength as to force the clutch heads 17 into engagement with the faces 16 upon the wheels, whereby a power connection between the axle and wheels is established.

Each of the clutch heads 17 is provided with a yoke 22, the said yokes being connected as by links 23 with an arm 24 pivoted upon the rear end of the frame 10 of the attachment. These arms have connected thereto the rear ends of cords or cables 25, the latter passing over guide pulleys 26 on the frame 10 and being connected at their forward ends to the steering apparatus of the vehicle. It will be observed that these cables are crossed at their forward ends and attached to a suitable rod 27 carried by the steering forks, and it is obvious, therefore, that as the forks are rotated in the vehicle frame one of the clutch heads will be disengaged from its coöperating clutch face 16. The arrangement is such that if the vehicle is steered to the right, the cable 25 at the right side of the vehicle will be tensioned, through the steering operation, sufficiently to withdraw the head 17 at the right end of the axle 10 from engagement with the clutch face 16, thereby permitting the wheel 12 at the right end of the axle 11 to idle, while the wheel at the opposite end of the axle is locked through the clutch mechanism to the said axle. The vehicle is thus allowed to turn sharply without danger of breaking any of the apparatus or overturning the same. As soon as the steering forks are straightened the cord or cable 25 at the right side of the machine is relaxed, whereupon the expansion springs 20 force the plates 19 inwardly, thus causing the clutch head 17 to frictionally engage with the face 16. The driving connection is thus established between the axle and both of the traction wheels.

The front fork 9 of the motorcycle has arranged at the lower end thereof skee runners 30. These runners are arranged in spaced parallel relation, and are connected to the lower ends of the forks by the bracket members 31.

From the foregoing it is obvious that we have provided an auto sleigh of extremely simple construction but which will prove highly efficient in practice. It is preferred that the frame 10 be of such construction and arrangement as will enable the same to be easily and quickly applied to the rear end of the frame 5 of the motorcycle, thus to enable the device to be readily converted from a motorcycle into an auto sleigh. The wheels 12 may be of any desired diameter or type, while the skee runners at the forward end of the vehicle may be supplanted by a toboggan. It will also be understood that the sprocket gears 13 and 15 may be of different proportions from those illustrated, whereby the ratio of speed may be varied. It will also be understood that the frame 10 may be permanently secured to the vehicle frame, so that the auto sleigh may be manufactured as such instead of being converted from a motorcycle into an auto sleigh as has been described.

The foregoing description and the drawings have reference to what may be considered the preferred, or approved, form of our invention. It is to be understood that we may make such changes in construction and arrangement and combination of parts, materials, dimensions, et cetera, as may prove expedient and fall within the scope of the appended claim.

Having thus fully described our invention, what we claim as new and desire to secure by Letters Patent, is:—

An attachment for vehicles comprising a frame, an axle in said frame, traction wheels loosely mounted on said axle, heads keyed upon said axle and adapted to move into contact with said wheels, posts extending from said wheels, a plate on each head slidably engaged with said posts, springs on said posts forcing said plates toward said wheels, nuts for regulating the tension of said springs, a pair of levers on said frame, cords connecting said levers with said heads, and means for attaching said frame to a vehicle.

In testimony whereof we affix our signatures in presence of two witnesses.

MARTIN LANDBY.
JOHN LANDBY.
ANDREW LANDBY.

Witnesses:
F. H. BROWN,
TREVOR GERRIE.

Copies of this patent may be obtained for five cents each, by addressing the "Commissioner of Patents, Washington, D. C."